(12) United States Patent
Kimura et al.

(10) Patent No.: US 6,539,243 B1
(45) Date of Patent: Mar. 25, 2003

(54) PORTABLE RADIO TERMINAL

(75) Inventors: Etsuko Kimura, Saitama (JP); Masayoshi Yamashita, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,975

(22) Filed: Oct. 4, 1999

(30) Foreign Application Priority Data

Oct. 5, 1998  (JP) ........................... 10-282523

(51) Int. Cl.[7] .............. H04B 1/38; H04B 1/02; G09G 5/00
(52) U.S. Cl. ............ 455/575; 455/550; 455/90; 345/840; 345/853; 345/854
(58) Field of Search ................. 345/170, 172, 345/168, 784, 801, 840, 853, 854, 864; 455/550, 556, 569, 575, 90

(56) References Cited

U.S. PATENT DOCUMENTS

| | | | | |
|---|---|---|---|---|
| 5,966,671 A | * | 1/1996 | Mitchell et al. | 455/575 |
| 5,933,143 A | * | 9/1997 | Kobayashi | 345/346 |
| 5,797,098 A | | 8/1998 | Schroeder et al. | 455/464 |
| 6,160,926 A | * | 8/1998 | Dow et al. | 382/313 |
| 5,892,475 A | * | 4/1999 | Palatsi | 345/352 |
| 5,956,655 A | | 9/1999 | Suzuki et al. | 455/566 |
| 6,131,048 A | * | 10/2000 | Sudo et al. | 455/566 |
| 6,185,295 B1 | * | 12/2000 | Frederiksen et al. | 379/355 |

FOREIGN PATENT DOCUMENTS

| | | | | |
|---|---|---|---|---|
| CH | 686 541 A5 | * | 4/1996 | H04M/1/02 |
| EP | 0 279 233 A2 | | 8/1988 | H04M/1/02 |
| EP | 0 633 684 A2 | | 1/1995 | H04M/1/72 |
| EP | 0 679 003 A2 | | 10/1995 | H04M/1/72 |
| EP | 2 310 567 A | | 8/1997 | H04M/1/00 |
| GB | 2 344 492 | | 6/2000 | |
| JP | 8-251266 | | 9/1996 | |
| JP | 09-251266 | | 9/1996 | H04M/1/27 |
| JP | 09-185450 | | 7/1997 | G06F/3/023 |
| JP | 10-243062 | | 9/1998 | |
| WO | WO 98/37681 | * | 8/1998 | H04M/1/00 |
| WO | WO 99/45459 | | 9/1999 | G06F/3/00 |

* cited by examiner

Primary Examiner—Edward F. Urban
Assistant Examiner—Meless Zewdu
(74) Attorney, Agent, or Firm—Sughrue Mion, PLLC (57) ABSTRACT

A portable radio terminal includes a radio communication section, radio terminal body, display screen, input buttons, and control section. The performs radio communication of a signal through a radio channel. The radio terminal body incorporates the radio communication section. The display screen is formed on the front surface of the radio terminal body to display functions. The input buttons include a plurality of operation buttons arranged near the display screen. The operation buttons have functions displayed at corresponding positions within the display screen. The control section executes a function in accordance with operation of the operation button.

15 Claims, 9 Drawing Sheets

PORTABLE RADIO TERMINAL

BACKGROUND OF THE INVENTION

The present invention relates to a portable radio terminal that improves operability of an input device and, more particularly, to a portable telephone.

A currently available portable telephone has many functions in addition to a speech communication function and is designed to execute each function in accordance with operation of a corresponding operation button. In a conventional portable telephone, when, for example, a telephone number calling function is to be executed, an assigned button is operated or a designated code is input. Dedicated buttons are set singly or in combinations for a menu, telephone book, "name search"/"dial search"/"address search"/"start/end character search"/"group search", and transmission/reception for short mail. Various setting methods are used.

More specifically, some of the buttons arranged on the front panel are set as execution buttons for the respective functions. A user executes a given function by selecting and pressing a corresponding button or directly inputting a corresponding one of the call codes designated for the respective functions with dial keys. Alternatively, the respective functions are scrolled and displayed in the order of designation numbers, and the user selects a desired function when it is displayed, thereby determining the function to be used.

In registering a dial destination (destination name), the user inputs "a hiragana (a Japanese character)" with buttons first, and then converts it into "a kanji (a Chinese character used in Japanese writing)" as the first candidate by pressing a conversion button. If the first candidate is not a desired "kanji" character, the user presses the conversion button to sequentially convert the character into the second and subsequent candidates. When the desired "kanji" character is displayed, the user presses a confirmation button to fix a dial destination and store it.

In a method of selecting a predetermined function by operating a dedicated function execution button, many function execution buttons are required in accordance with the number of functions. In a method of inputting a number for designating a function with dial keys, all the numbers for designating the respective functions must be stored in advance. When scroll operation on a display screen is to be performed to search for a function, all the functions are sequentially displayed in a predetermined order. In this case, therefore, if a desired function is set at a middle position or position in the latter part of a predetermined order, it takes time to call up the desired function on the screen. In addition, the user must operate buttons to scroll the screen and select a displayed function.

In executing a given function, when processing on a desired function window is complete, the initial window is restored, and the user selects a function again. When, therefore, the same function is to be repeatedly performed as in registration of a plurality of dial destinations, the initial window is restored every time setting of a dial destination is complete. Hence, the user must select and execute the number registration function again by using a designation number or the like, thus requiring troublesome operation. Furthermore, when the user makes an operation error in the process of executing a function, the initial window is restored upon end operation. The user must therefore set the number registration function again by using the designation number.

In kanji input operation, the user must press a button or the like to perform kanji conversion every time he/she inputs information in hiragana. In general, a minute indication that designates kanji conversion is written on a side surface or the like of a button. This indication is difficult for the user to read. In addition, if a plurality of functions are assigned to one button, the respective functions are written in different colors or the like. As a consequence, the written characters become smaller, and it is difficult for the user to know which function is currently set.

A rotary-dial input switch is also known. When this rotary-dial input switch is rotated clockwise or counterclockwise, a dial destination search function is started from the initial window, and dial destinations are scrolled. However, there is no correspondence between the rotational direction of the switch and a window. If, therefore, choices are arranged in the lateral direction of the screen, the dial operation become irrelevant to the display, posing a problem.

In addition, when a search is started from "A" in the clockwise direction of the dial, a search is started from "Z" in the counterclockwise direction of the dial. As described above when the rotary dial is used, this system can only be set such that the same function is started from both the clockwise and counterclockwise directions. However, two different functions cannot be started in accordance with the rotational directions, and hence the number of functions that can be set is undesirably limited.

SUMMARY OF THE INVENTION

It is an object of the present invention to provide a portable radio terminal with easy input operation.

In order to achieve the above object, according to the present invention, there is provided a portable radio terminal comprising radio communication means for performing radio communication of a signal through a radio channel, a radio terminal body incorporating the radio communication means, a display screen which is formed on a front surface of the radio terminal body to display functions, input buttons including a plurality of operation buttons arranged near the display screen, the operation buttons having functions displayed at corresponding positions within the display screen, and control means for executing a function in accordance with operation of the operation button.

DESCRIPTION OF THE PREFERRED EMBODIMENT

The present invention will be described in detail below with reference to the accompanying drawings.

Figure 1:
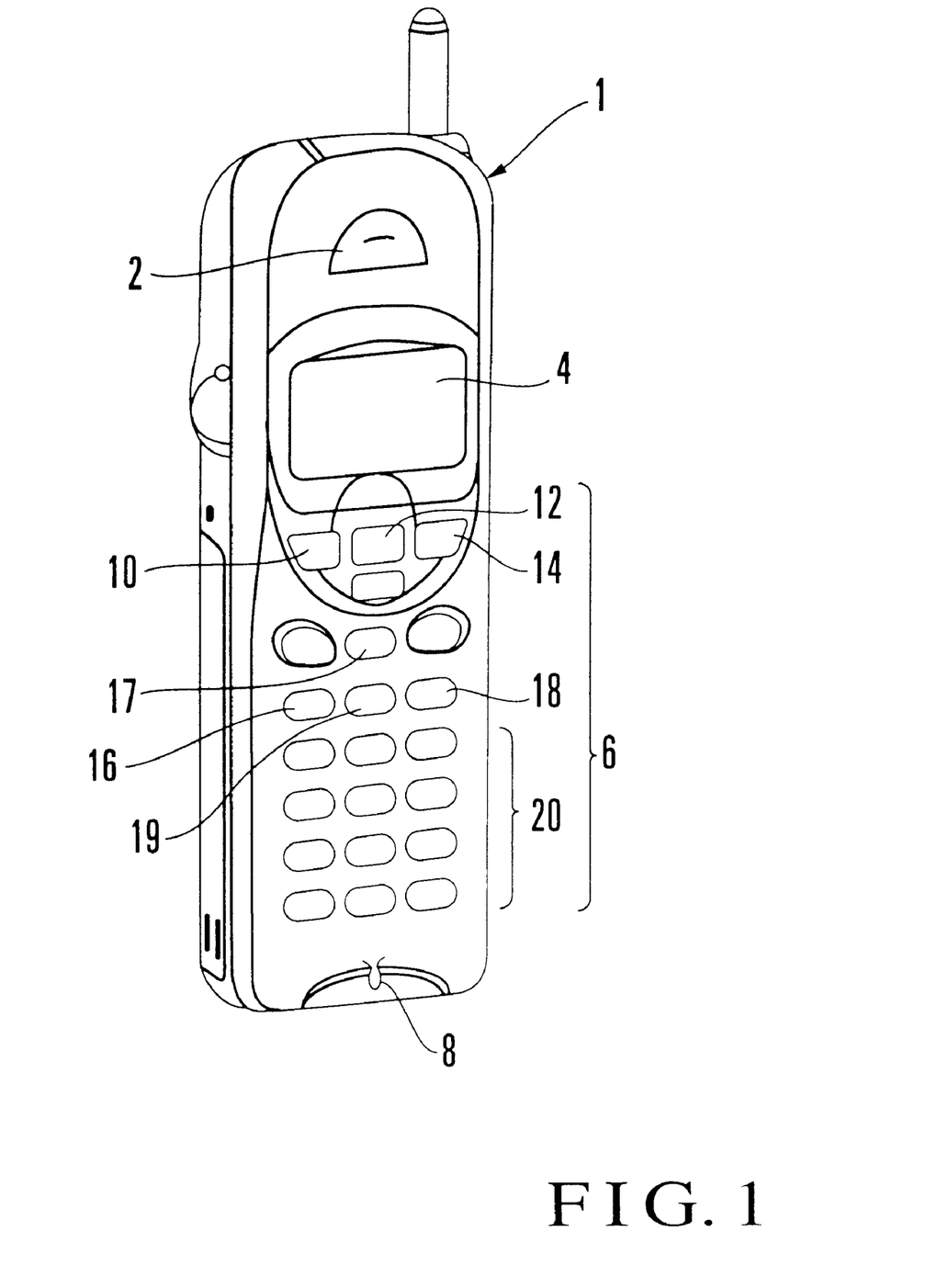
FIG. 1 is a perspective view of a portable telephone according to an embodiment of the present invention.

FIG. 1 shows a portable telephone according to an embodiment of the present invention. As shown in FIG. 1, a receiver 2, display screen 4, input buttons 6, and transmitter 8 are arranged on the front surface of a telephone body 1. The input buttons 6 include a left scroll button 10, confirmation button 12, and right scroll button 14 which are arranged, below the display screen 4, in a line from the left, a power switch 17 below the confirmation button 12, a start button 16, redial button 19, and end button 18 which are arranged in a line below the power switch 17, and dial keys 20 for inputting numbers.

Figure 2:
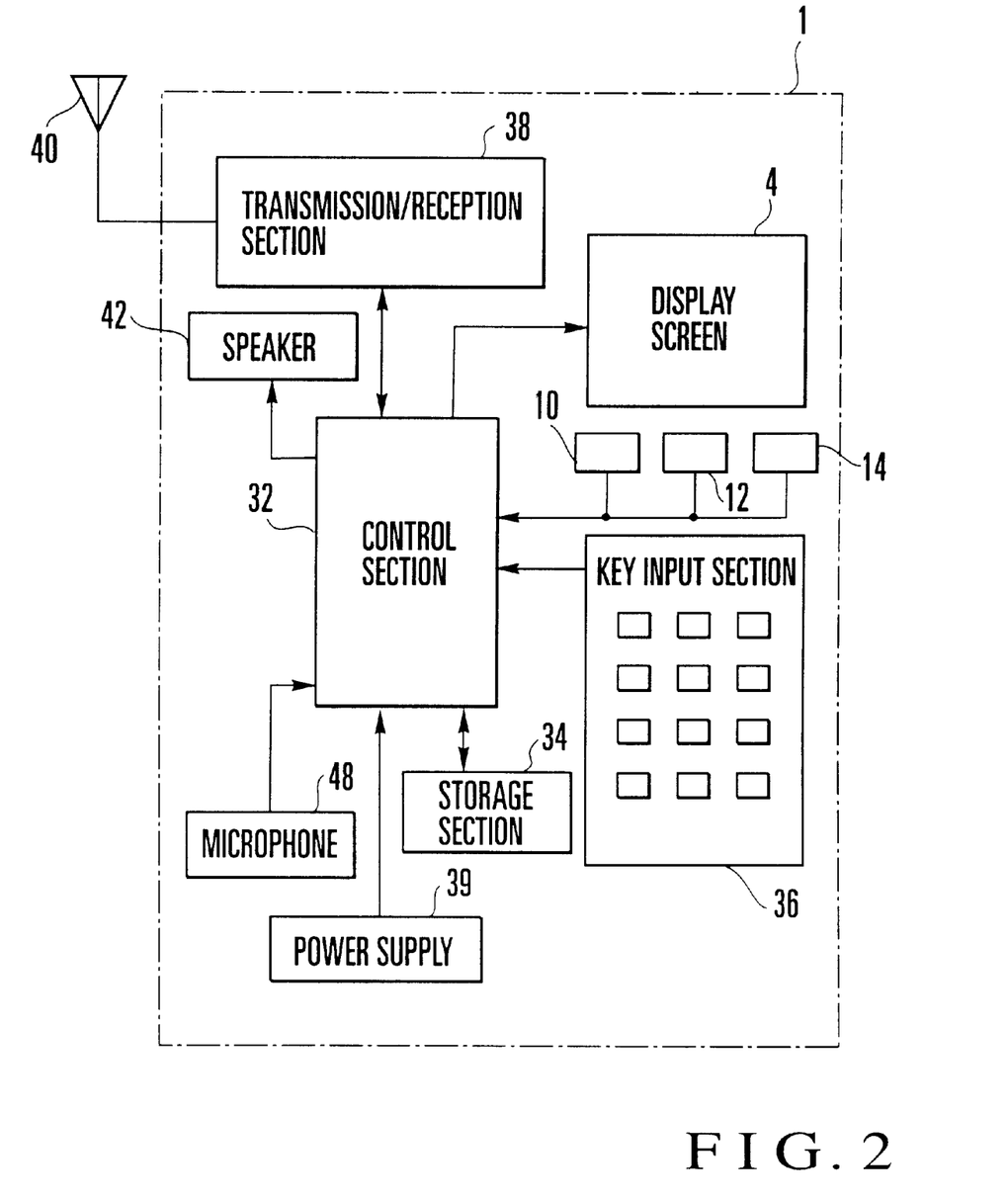
FIG. 2 is a block diagram of the portable telephone in FIG. 1.

As shown in FIG. 2, the telephone body 1 is comprised of a control section 32 for controlling the overall telephone including the display screen 4, storage section 34 for storing telephone numbers, functions, and the like, key input section 36 including the dial keys 20, transmission/reception section 38, antenna 40, microphone 48, speaker 42, and power supply 39.

Figure 3:
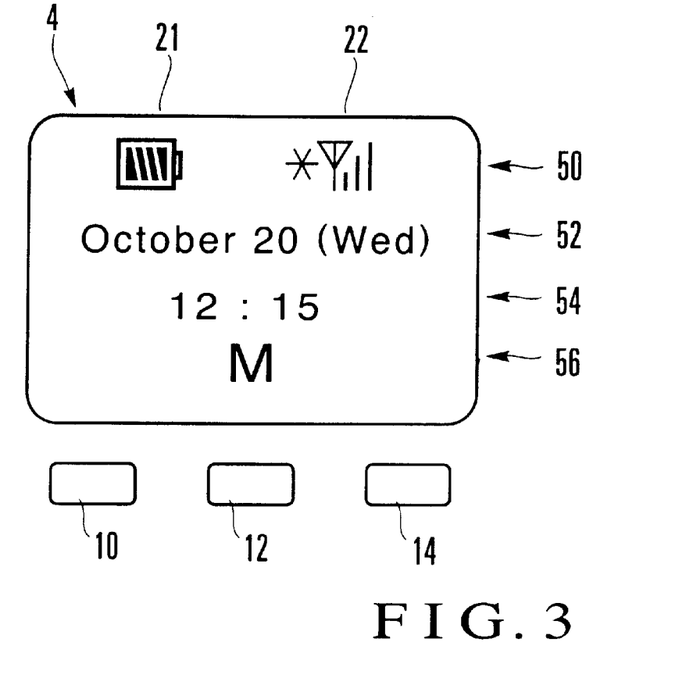
FIG. 3 is a view showing an initial window on the display screen in FIGS. 1 and 2.

The display screen 4 is formed from a liquid crystal display device. As shown in FIG. 3, a level row 50 for indicating a voltage level 21 of a battery and reception level 22 is set on the upper row on the screen. A dial destination row 52 for indicating an input dial destination or set state and telephone number row 54 for displaying a telephone number are sequentially arranged below the level row 50. An operation display row 56 for displaying the operation information of the left scroll button 10, confirmation button 12, and right scroll button 14 is set below the telephone number row 54.

Icons are displayed on the operation display row 56 in correspondence with the left scroll button 10, confirmation button 12, and right scroll button 14 arranged below the display screen 4. Note that the respective rows on the display screen 4 are not limited to these and may be properly changed in accordance with the contents of processing.

The function of each button will be described next.

Figure 5:
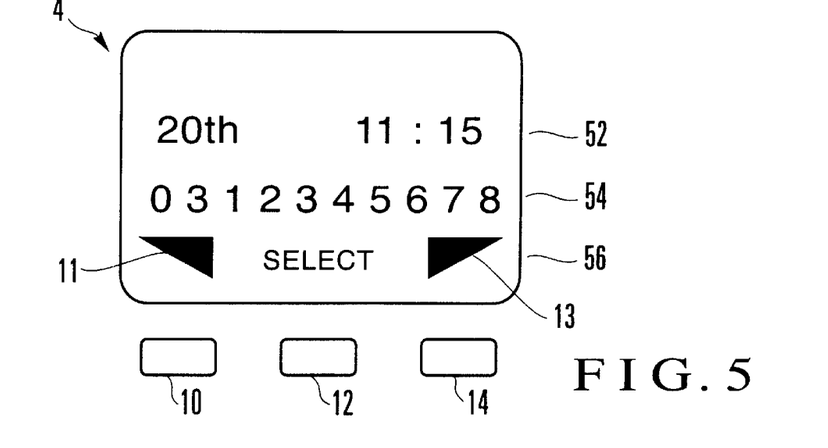
FIG. 5 is a view showing a redial window on the display screen in FIGS. 1 and 2.

The left scroll button 10 is a button for scrolling the display contents on the laterally elongated display screen 4 mainly to the left. When this button functions as a scroll button, a scroll icon 11 is displayed on the left end of the operation display row 56, as shown in FIG. 5. On the initial window shown in FIG. 3, the user instructs the control section 32 to execute a mail information processing function by long-period pressing of the left scroll button 10 (pressing it for a predetermined period of time or more) and execute group search processing by short-period pressing of the button (pressing it for less than a predetermined period of time).

The confirmation button 12 at the middle position is mainly used to instruct the control section 32 to execute the function indicated by the middle icon of the three icons displayed on the telephone number row 54 on the display screen 4. On the initial window in FIG. 3, the user instructs the control section 32 to execute a function search function by long-period of pressing of the confirmation button 12 and execute menu information processing by short-period pressing of the button.

Similar to the left scroll button 10, the right scroll button 14 is a button for scrolling the display contents on the laterally elongated display screen 4 mainly to the right. When the right scroll button 14 functions as a scroll button, a scroll icon 13 is displayed on the right end of the operation display row 56, as shown in FIG. 5. On the initial window in FIG. 3, the user instructs the control section 32 to execute an index search function by long-period pressing of the right scroll button 14 and execute name search processing by short-period pressing of the button.

The operation of the portable telephone having the above arrangement will be described function by function next.

Originating operation will be described first.

Figure 4:
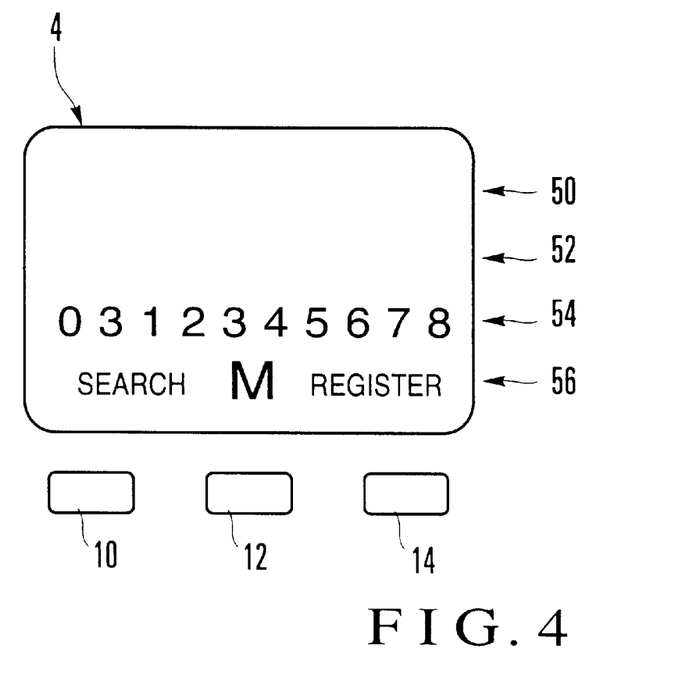
FIG. 4 is a view showing a telephone number input window on the display screen in FIGS. 1 and 2.

When the user turns on the power supply of the telephone body 1 by operating the power switch 17, the initial window shown in FIG. 3 appears on the display screen 4. When the user inputs a telephone number corresponding to a dial destination with the dial keys 20, the input digits are sequentially displayed on the telephone number row 54, as shown in FIG. 4. When the start button 16 is operated after all the digits of a desired telephone number are input, an outgoing call is sent to the dial destination through the transmission/reception section 38 and antenna 40. The user operates the end button 18 to end the speech communication.

When a call is to be made to a telephone number that was dialed in the past, the user presses the redial button 19 to make the dial window shown in FIG. 5 appear on the display screen 4. More specifically, the date of the past call is displayed on the dial destination row 52, and the telephone number of the dial destination is displayed on the telephone number row 54. When the user operates the left scroll button 10 or right scroll button 14 in this state, the telephone numbers of past calls are sequentially scrolled/displayed. When a predetermined telephone number is displayed on the display screen 4, the user operates confirmation button 12 first, and then performs dialing by operating the start button 16. In this case, the user may perform dialing without operating the confirmation button 12.

Figure 8:
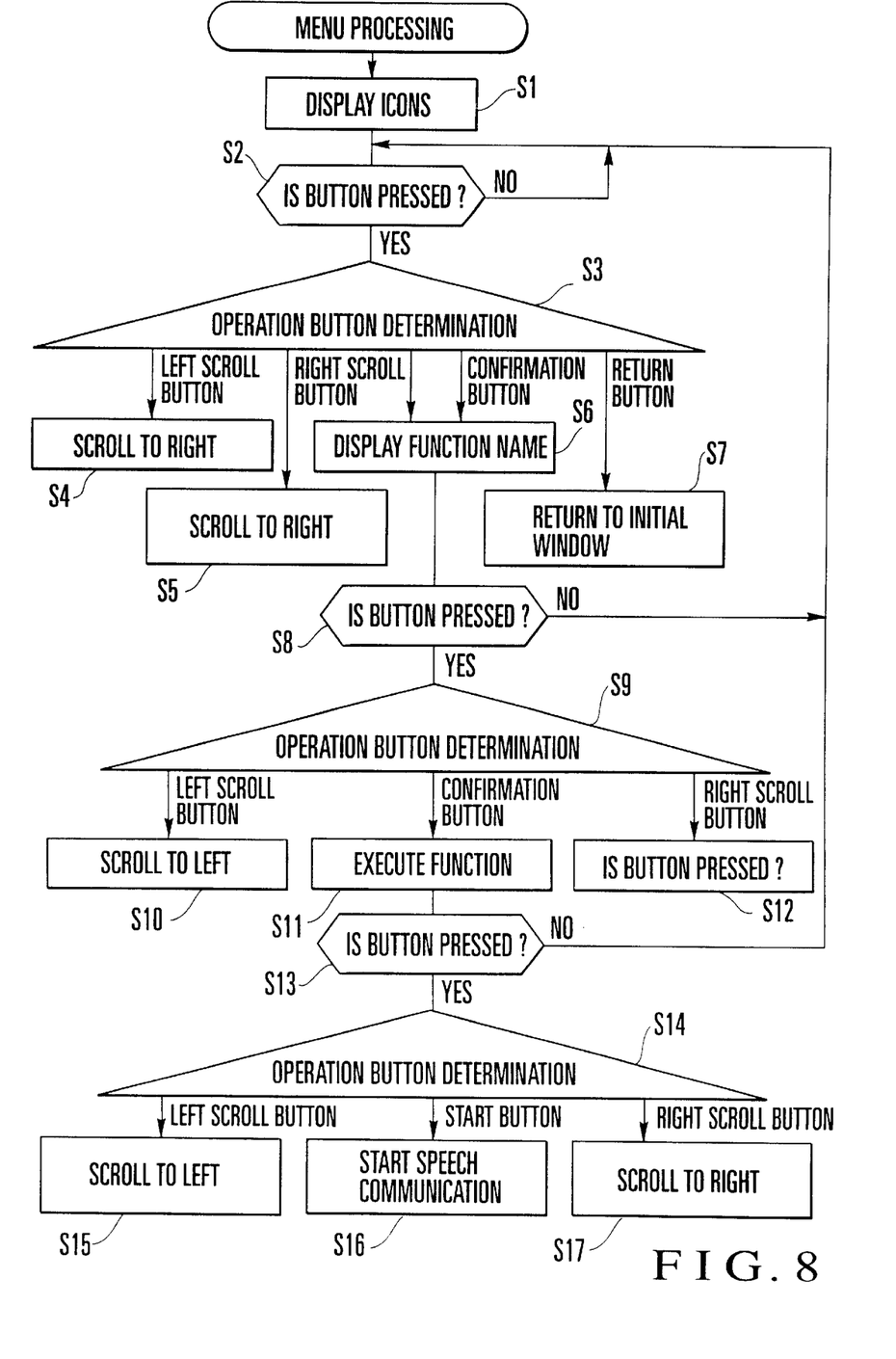
FIG. 8 is a flow chart showing originating operation based on a registered telephone number.

The operation of originating a call by calling up a telephone number stored in the telephone body 1 will be described next with reference to the flow chart of FIG. 8.

Figure 6:
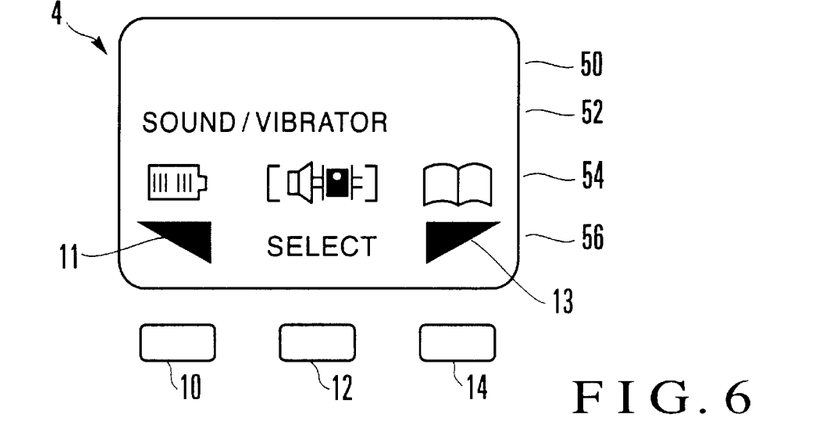
FIG. 6 is a view showing a menu window on the display screen in FIGS. 1 and 2.

On the initial window (FIG. 3) in the ON state, the user presses the confirmation button 12 to shift to menu processing. As a consequence, icons are displayed on the display screen 4, as shown in FIG. 6 (step S1). More specifically, a plurality of icons including three main items are displayed on the telephone number row 54. The character string "selection" is displayed in the middle of the operation display row 56 below the telephone number row 54, while the scroll icons 11 and 13 are displayed on the left and right sides of the character string. The sizes and display positions of the scroll icons 11 and 13 vary depending on the levels of the items.

The main items include categories of a telephone book, timepiece display, and charge display. Sub-items below the main items include a call charge, total call charge, and the like classified according to the main items. When a dial destination or the like is input, since the functions of main items and sub-items which can be executed in association with dial destination input operation are classified in advance, functions are sequentially called up from the input dial destination.

Only the functions associated with dial destination input operation are called up, including, for example, the function of newly adding another telephone number to the dial destination row, the function of deleting the telephone number, and the function of changing the dial destination. Any functions irrelevant to dial destination input operation, e.g., the function of setting the current time, cannot be called up by scrolling. This is not limited to an input dial destination.

Referring to FIG. 6, a sound/vibrator icon is displayed in the middle of the telephone number row 54, while a battery icon and telephone book/memory icon are respectively displayed on the left and right sides of the telephone number row 54. The character string "sound/vibrator" is displayed on the dial destination row 52 above the telephone number row 54.

The user then operates the left scroll button 10 to move the main item of "telephone book/memory" located on the right side of the telephone number row 54 to the left (step S4) and places the item in the middle of the row. When the main item of "telephone book/memory" is placed in the middle of the row, the user operates the confirmation button 12 to instruct the control section 32 to perform "telephone book/memory" processing. Note that the right scroll button 14 is operated to move the window to the right (step S5).

Figure 7:
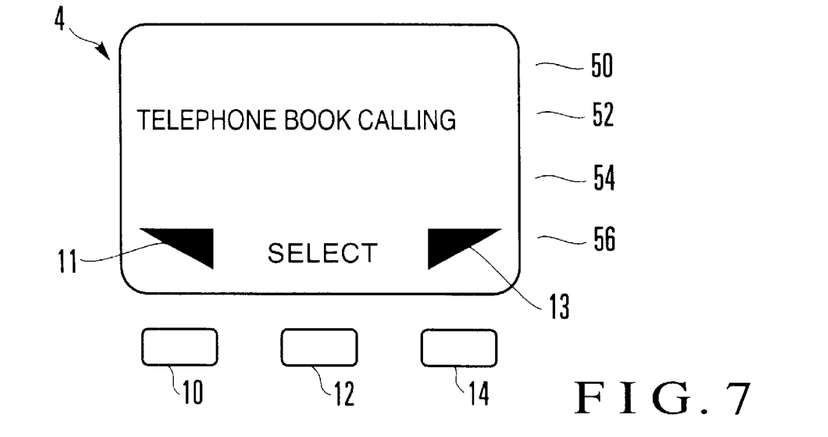
FIG. 7 is a view showing a telephone book calling window on the display screen in FIGS. 1 and 2.

In "telephone book/memory processing", the display screen 4 is set in the state shown in FIG. 7, and the function name is displayed on the dial destination row 52 while the sizes of the scroll icons 11 and 13 are changed (step S6). In this case, since the sub-item of "telephone book calling" is the first =sub-item in the "telephone book/memory" processing, the sub-item of "telephone book calling" is displayed first, as shown in FIG. 7. When another sub-item is to be selected, the user operates the left and right scroll buttons 10 and 14 (steps S10 and S12) to call a predetermined item. When the item of "telephone book calling" is to be selected, the user presses the confirmation button 12 to determine the function on the display screen 4 shown in FIG. 7.

With this operation, the control section 32 calls up the telephone book (step S11), and the user inputs a memory number or operates the left and right scroll buttons 10 and 14 to scroll the display (steps S15 and S17) so as to display a stored telephone number together with a dial destination. In this screen scrolling, dial destinations are sequentially displayed in the order of memory numbers or in the reverse order. When, therefore, a desired dial destination is displayed, the user operates the start button 16 to start speech communication (step S16).

In this manner, the functions are hierarchically classified, and a search sequentially proceeds from main items to sub-items, thereby allowing the user to efficiently select and execute a desired function even if he/she does not remember the designation number of the function. In addition, scrolling is performed by operating the left and right scroll buttons 10 and 14 below the display screen 4, and selection/confirmation is performed by operating the confirmation button 12 placed between the scroll buttons. This facilitates the operation of the telephone body 1 even while it is held with one hand. Furthermore, the user can perform operation while seeing the scrolling screen and operation buttons at once.

In steps S2, S8, and S13, it is checked whether button operation is performed. In steps S3, S9, and S14, the type of button operated is checked.

Registering operation of a memory dial will be described next.

Figure 9:
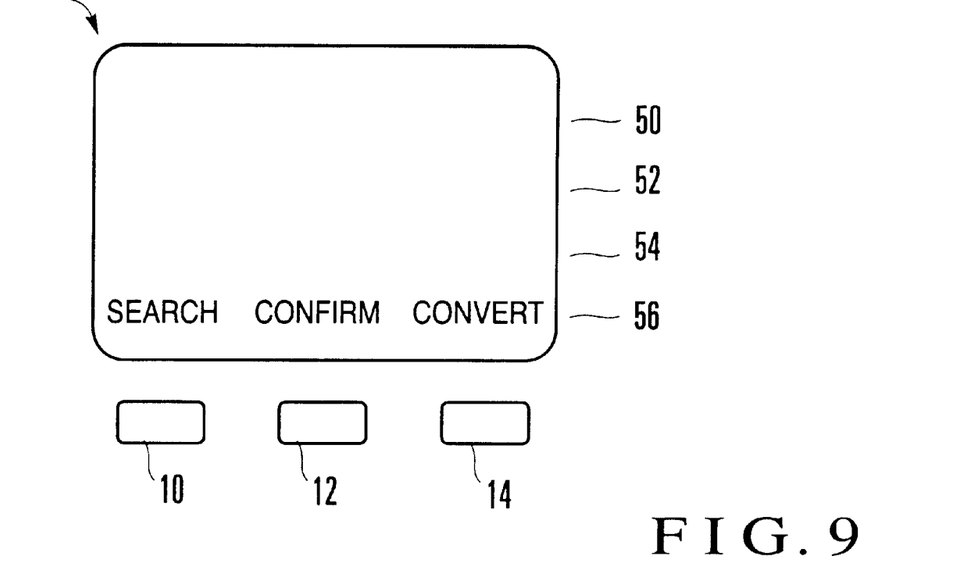
FIG. 9 is a view showing a telephone number registration window on the display screen in FIGS. 1 and 2.

Assume that the telephone number of "MR. ODA" as a dial destination is to be registered. First of all, as shown in FIG. 9, the user operates the input buttons 6 to input "xy" representing "ODA" in Japanese character. With this operation, the character string "xy" is displayed on the telephone number row 54 on the display screen 4, and the character strings "search", "confirm", and "convert" representing the functions of the operation buttons are displayed on the operation display 10 row 56 from the right. The user operates the conversion button (right scroll button 14) in accordance with the functions of the operations displayed on the display screen 4 to convert the character string "xy" into a Chinese character string.

Figure 10:
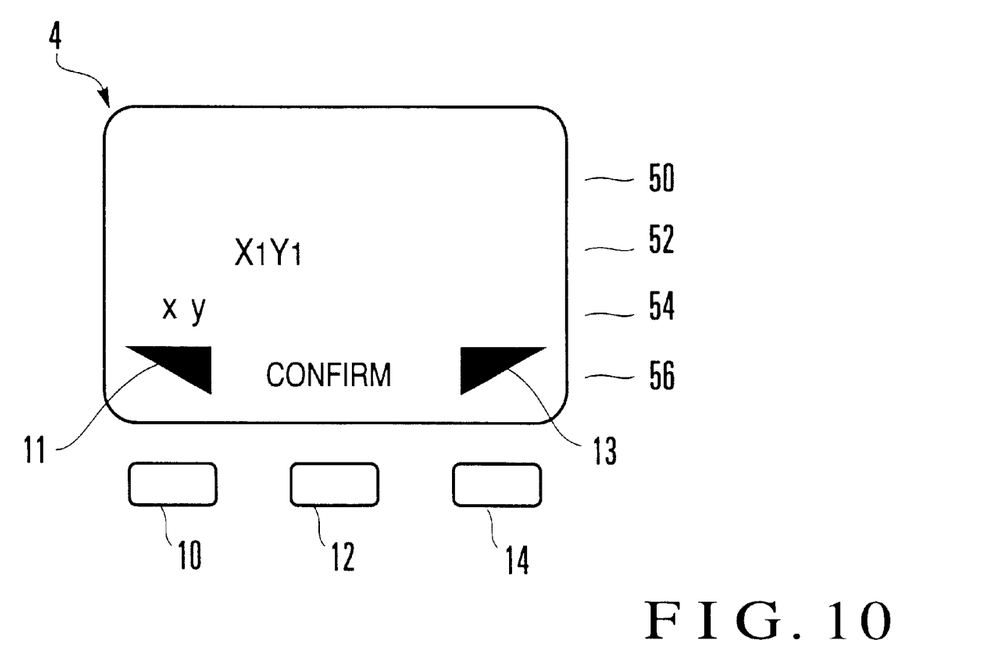
FIG. 10 is a view showing a conversion window that is changed from the telephone number registration window in FIG. 9.
Figure 11:
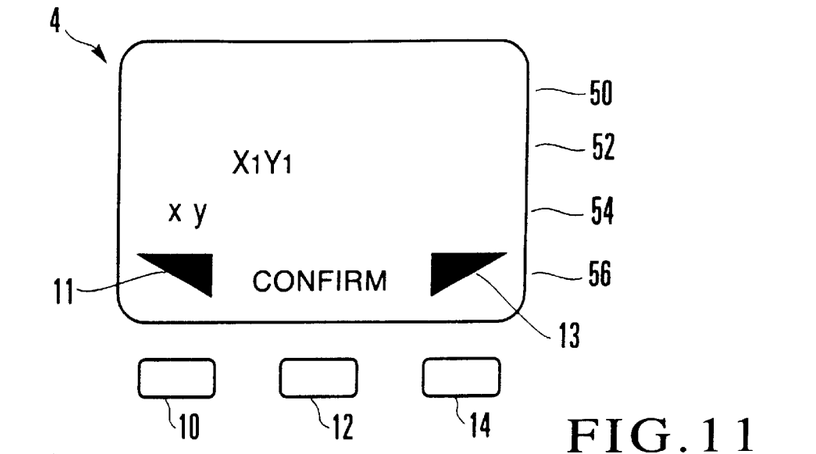
FIG. 11 is a view showing a conversion window which is further changed from the display screen in FIG. 10.

FIG. 10 shows the display screen 4 after conversion. On the display screen 4 shown in FIG. 10, "$X_1Y_1$" converted from "xy", the scroll icons 11 and 13 indicating the functions of the left and right scroll buttons 10 and 14, and "confirm" representing the function of the confirmation button 12 are displayed. In this case, since "$X_1Y_1$" is not the correct Chinese character expression of "ODA", the user operates the right scroll button 14 to further convert the character string to another Chinese character string. When "$X_2Y_1$" that is the correct Chinese character expression of "ODA" is displayed, as shown in FIG. 11, the user operates confirmation button 12 to confirm the character string. Finally, a telephone number is input to the item corresponding to the dial destination and stored.

As described above, the scroll buttons 10 and 14 and the conversion button (right scroll button 14) are arranged immediately below the display screen 4, and the functions of the buttons are displayed on the display screen 4, as needed. The user need not operate a plurality of operation buttons arranged on the front surface of a telephone body while reading functions printed in small character near the respective buttons as in the prior art, and hence can perform input operation reliably and easily.

Assume that a plurality of dial destinations are to be consecutively registered as in telephone number registration. In this case, even when registration of a telephone number corresponding to one dial destination is completed, the display does not return to the initial window but is restored by one level. That is, the telephone number registration function is restored to allow the user to continue registration of another dial destination. This makes it possible to consecutively and efficiently perform the same operation.

Figure 12:
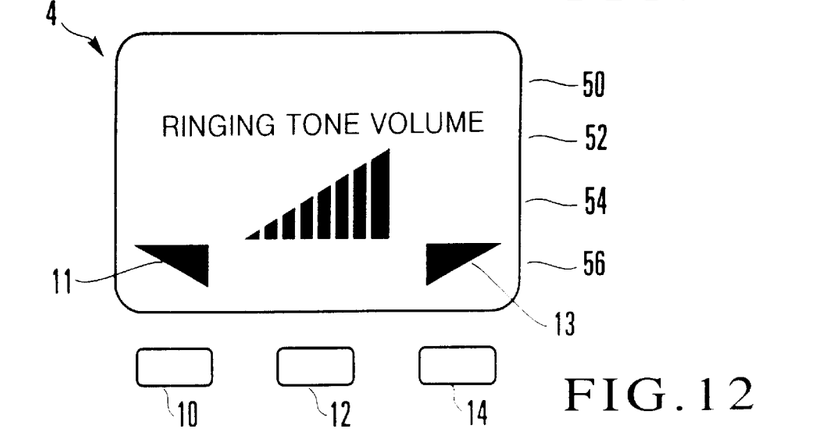
FIG. 12 is a view showing a ringing tone volume adjustment window on the display screen in FIGS. 1 and 2.

When the volume of a ringing tone is to be adjusted, a window representing the function of adjusting the volume of a ringing tone and including the scroll icons 11 and 13 appears on the screen. In this case, the user can recognize the left and right scroll buttons 10 and 14 as volume increasing and decreasing buttons at a glance, and hence can increase/decrease the volume level by operating the left and right scroll buttons 10 and 14. In this case, the ringing tone volume is expressed in analog display. Obviously, however, digital display (numerical display) may be performed.

Figure 13:
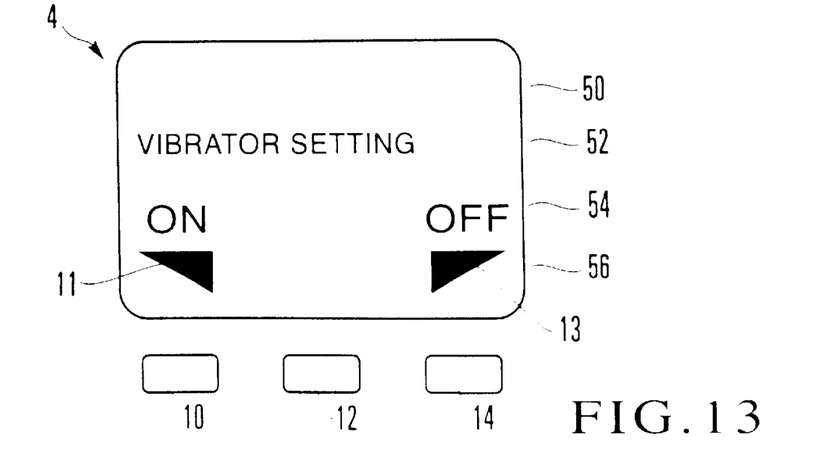
FIG. 13 is a view showing a termination vibrator setting window on the display screen in FIGS. 1 and 2.

When a termination vibrator function is to be set (choice between ON and OFF), the character strings "ON" and "OFF" are respectively displayed above the left and right scroll buttons 10 and 14 on the termination vibrator function window, as shown in FIG. 13. The user can therefore easily set the termination vibrator function ON/OFF by operating the left and right scroll buttons 10 and 14.

If ON/OFF selection is assigned to one operation button (e.g., left scroll button 10), "ON" and "OFF" can be alternately selected by repeatedly operating the corresponding operation button.

Another selection method will be described next.

Specific functions that are frequently used can be directly called up in accordance with the operation states of the buttons 10, 12, and 14 to which such functions are assigned. For example, these functions include the functions of mail information processing, menu information processing, "name search" information processing, "group search" information processing, "index search" information processing, and "function search" information processing.

Figure 14:
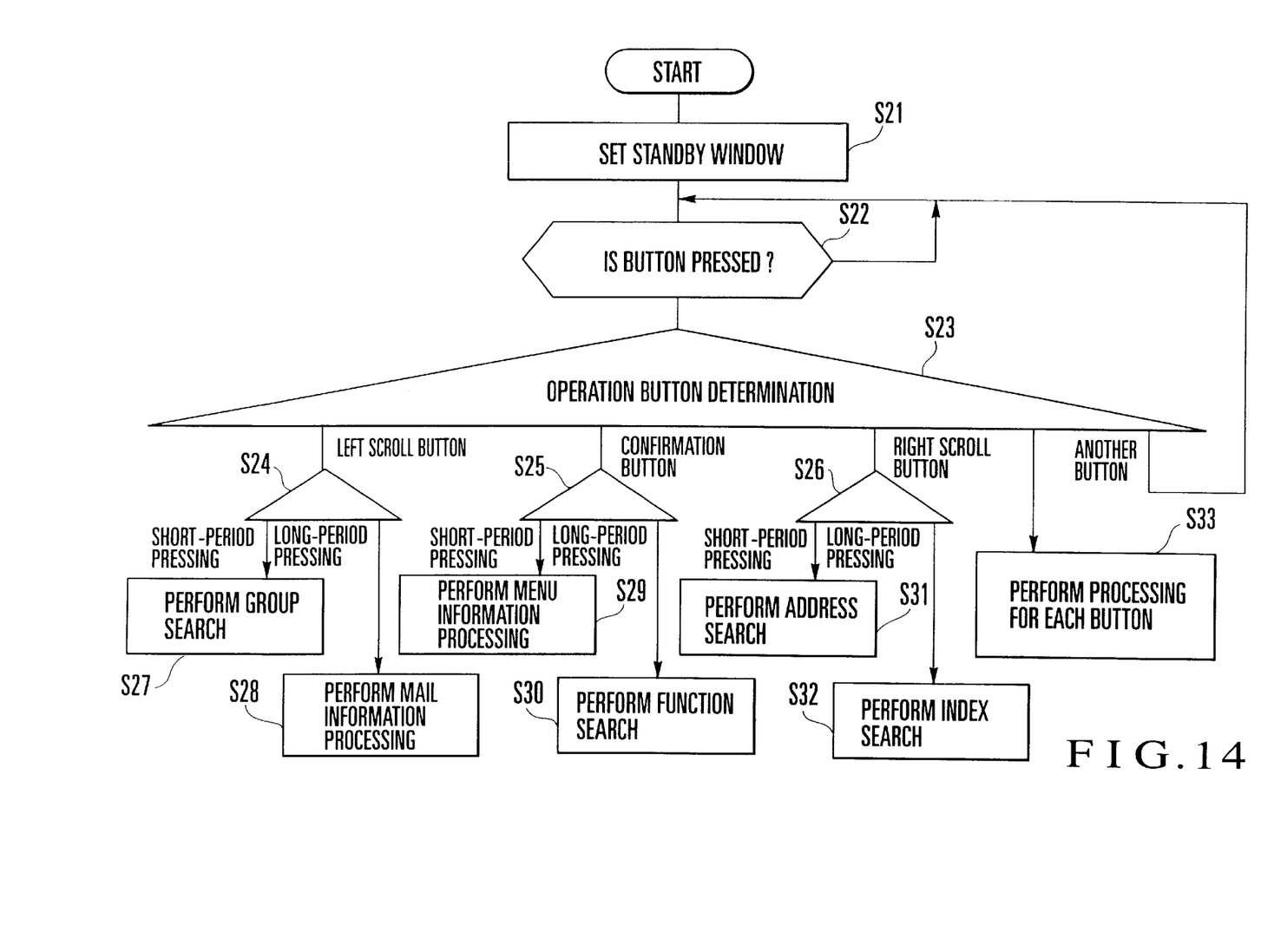
FIG. 14 is a flow chart showing function selection performed by short-period/long-period pressing of left and right scroll buttons and confirmation button.

More specifically, as shown in FIG. 14, on the initial window in a standby state (step S21), it is checked whether a button is operated (step S22). If button operation is detected, the type of operation button and short-period pressing/long-period pressing are checked (steps S23 to S26). If it is determined that the left scroll button 10 is pressed for a short period of time, "group search" is executed (step S27). If it is determined that the left scroll button 10 is pressed for a long period of time, mail information processing is executed (step S28).

Likewise, if it is determined that the confirmation button 12 is pressed for a short period of time, the menu information processing function is executed (step S29). If it is determined that the confirmation button 12 is pressed for a long period of time, "function search" information processing is executed (step S30). If it is determined that the right scroll button 14 is pressed for a short period of time, the "dial destination search" information processing function is executed (step S31). If it is determined that the right scroll button 14 is pressed for a long period of time, the "index search" function is executed (step S32).

In this manner, the user can quickly select and execute a desired function by selecting it from a plurality of functions assigned to the respective buttons 10, 12, and 14 in accordance with the operation times of the buttons.

In the "number search" function, when the left and right scroll buttons 10 and 14 are pressed for a short period of time, the displayed contents are shifted forward or backward in units of rows of hiragana characters in the form of a matrix. When the left and right scroll buttons 10 and 14 are pressed for a long period of time, the displayed contents are skipped forward or backward in units of columns of hiragana characters in the form of a matrix.

Figure 15:
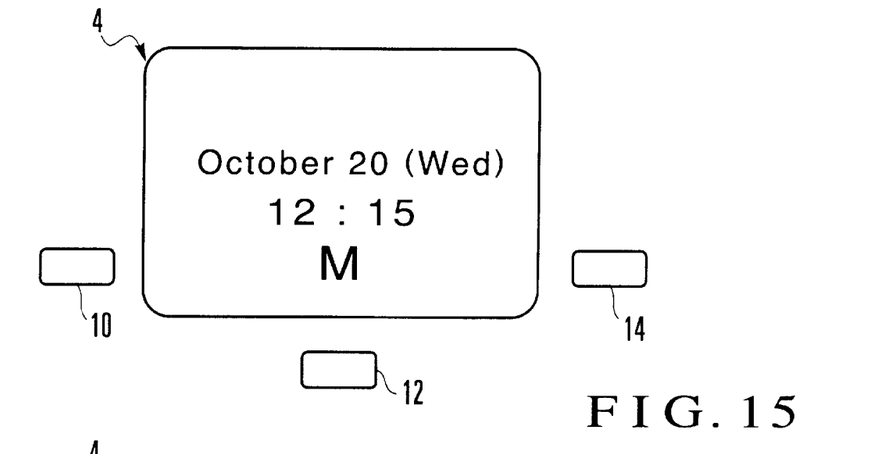
FIG. 15 is a view showing another layout of the left and right scroll buttons.

In this embodiment, the left and right scroll buttons 10 and 14 are arranged below the display screen 4. However, the present invention is not limited to this. For example, as shown in FIG. 15, the left scroll button 10 may be set on the left side of the display screen 4; the confirmation button 12, on the lower side of the display screen 4; and right scroll button 14, on the right side of the display screen 4. In this case, the corresponding icons are arranged near the respective buttons on the display screen 4.

The functions of the respective buttons corresponding to the display screen 4 are not limited to those described above.

Figure 16:
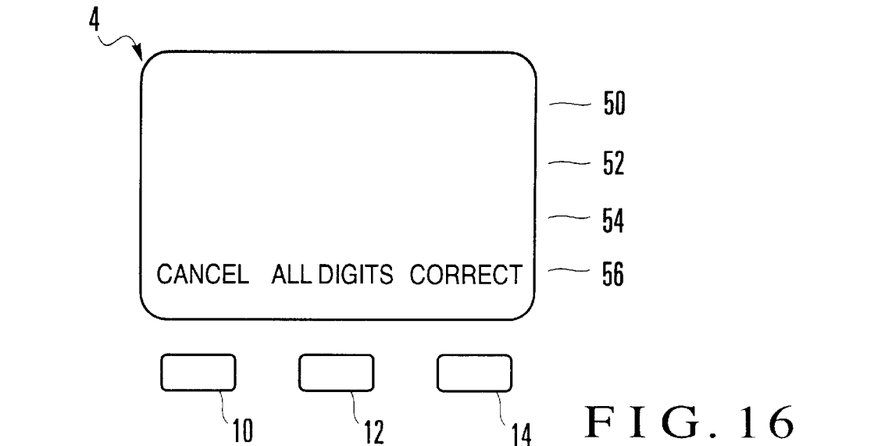
FIG. 16 is a view showing a display screen on which other functions are assigned to operation buttons.
Figure 17:
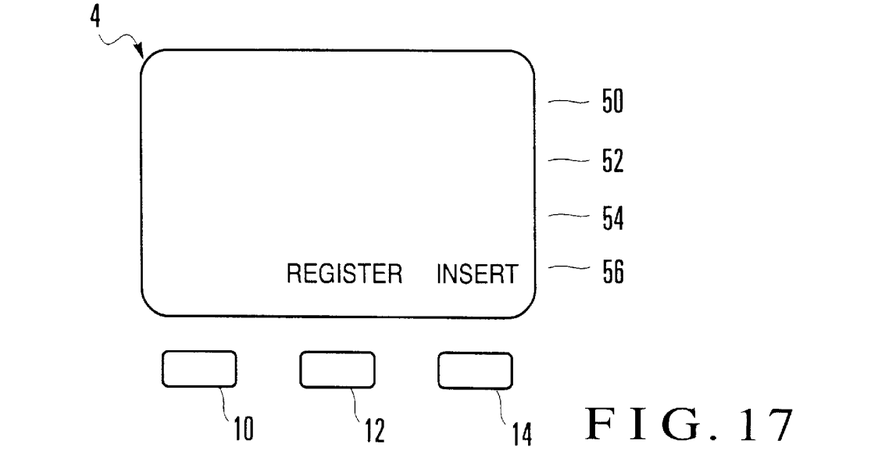
FIG. 17 is a view showing a display screen on which other functions are assigned to the operation buttons.

As shown in FIG. 16, "cancel", "all digits" representing all-digit display, and "correct" may be set as functions. Alternatively, as shown in FIG. 17, necessary functions such as "register" and "insert" can be arbitrarily set. In addition, the number of buttons whose functions are displayed on the display screen 4 is not limited to three.

The portable radio terminal of the present invention has the following effects.

1. Since the buttons are arranged in correspondence with the screen display, the user can easily understand the contents of the functions of the buttons. This facilitates input operation.

2. Every time the user selects a given item, only the functions associated with the item are called up, but no irrelevant functions are called up. This makes it possible to efficiently select and set a desired function.

3. Since the functions are hierarchically arranged, the user can easily select a desired function. In addition, when the user ends a given function, the display returns to the start position of the function. When, therefore, the same operation is consecutively performed, the user need not select the same function again. This can improve the efficiency of the operation.

4. Even if a plurality of functions are assigned to one button, since each function is displayed on the display screen, there is no need to write many small characters to explain the functions of the button. This allows the user to easily understand the functions of each button and check them on the screen. The user can therefore easily operate the buttons while seeing the screen.

5. Since a plurality of functions can be assigned to each button, reductions in the size and weight of a portable telephone can be attained.

6. Since different scroll icons are displayed on the respective levels, the user can easily recognize the current level on which he/she operates the telephone.

7. The function of selecting one of two states facilitates ON/OFF setting.

8. The user can set a numerical value and switch functions with a single button.

What is claimed is:

1. A portable radio terminal comprising:
   radio communication means for performing radio communication of a signal through a radio channel;
   a radio terminal body incorporating said radio communication means;
   a display screen which is formed on a front surface of said radio terminal body to display functions;
   input buttons including a plurality of operation buttons arranged near said display screen, said operation buttons having functions displayed at corresponding positions within said display screen; and
   control means for executing a function in accordance with operation of said operation button,
   wherein functions that can be selected are hierarchically arranged in accordance with hierarchical levels of said display screen, and
   a size of the functions displayed on said display screen changes in accordance with the hierarchical levels of said display screen.

2. A terminal according to claim 1, wherein first, second, and third buttons constituting said operation buttons are successively arranged in a line along said display screen,
   said first and third buttons arranged on two sides are assigned as scroll buttons for said display screen in information input operation, and said second button placed at a middle position is assigned as a selection processing button for contents displayed on said display screen in information input operation.

3. A terminal according to claim 2, wherein an icon for designating selection in correspondence with said second button is displayed on said display screen, and two scroll icons are displayed on said display screen in correspondence with said first and third buttons.

4. A portable radio terminal comprising:
radio communication means for performing radio communication of a signal through a radio channel;
a radio terminal body incorporating said radio communication means;
a display screen which is formed on a front surface of said radio terminal body to display functions;
input buttons including a plurality of operation buttons arranged near said display screen, said operation buttons having functions displayed at corresponding positions within said display screen; and
control means for executing a function in accordance with operation of said operation button,
wherein functions that can be selected are hierarchically arranged in accordance with hierarchical levels of said display screen,
a size of the functions displayed on said display screen changes in accordance with the hierarchical levels of said display screen,
wherein ON and OFF states of a function are respectively assigned to first and second buttons of said operation buttons,
ON display and OFF display are respectively performed on said display screen at positions corresponding to said first and second buttons; and
ON/OFF selection of the function is performed by operating said first and second buttons corresponding to the ON display and OFF display, respectively.

5. A portable radio terminal comprising:
radio communication means for performing radio communication of a signal through a radio channel;
a radio terminal body incorporating said radio communication means;
a display screen which is formed on a front surface of said radio terminal body to display functions;
input buttons including a plurality of operation buttons arranged near said display screen, said operation buttons having functions displayed at corresponding positions within said display screen; and
control means for executing a function in accordance with operation of said operation button,
wherein functions that can be selected are hierarchically arranged in accordance with hierarchical levels of said display screen,
a size of the functions displayed on said display screen changes in accordance with the hierarchical levels of said display screen,
wherein an ON/OF state of a function is assigned to a first button of said operation buttons,
ON/OFF display is performed on said display screen at a position corresponding to said first button, and
ON and OFF states of the function are alternately selected by repeatedly operating said operation button corresponding to the ON/OFF display.

6. A terminal according to claim 2, wherein said first and third buttons arranged on the two sides are assigned as numerical value/amount increasing and decreasing buttons, and said second button placed at the middle position is assigned as a numerical value/amount determination selecting button.

7. A terminal according to claim 2, wherein when said display screen is an initial window, menu selection is performed by short-period pressing of said second button which is performed for less than a predetermined period of time, and
a function search is performed by long-period pressing of said second button which is performed for not less than a predetermined time.

8. A portable radio terminal comprising:
radio communication means for performing radio communication of a signal through a radio channel;
a radio terminal body incorporating said radio communication means;
a display screen which is formed on a front surface of said radio terminal body to display functions;
input buttons including a plurality of operation buttons arranged near said display screen, said operation buttons having functions displayed at corresponding positions within said display screen; and
control means for executing a function in accordance with operation of said operation button,
wherein first, second, and third buttons constituting said operation buttons are successively arranged in a line along said display screen,
said first and third buttons arranged on two sides are assigned as scroll buttons for said display screen in information input operation, and
said second button placed at a middle position is assigned as a selection processing button for contents displayed on said display screen in information input operation,
wherein when said display screen is an initial window, said first and third buttons are respectively assigned as a button for performing a "group search" and a button for performing information processing for a "dial destination search".

9. A terminal according to claim 8, wherein a "group search" is performed by short-period pressing of said first button which is performed for not less than a predetermined period of time,
mail information processing is performed by long-period pressing of said first button which is performed for not less than the predetermined period of time,
a dial destination search is performed by short-period pressing of said third button which is performed for less than the predetermined period of time, and
an index search is performed by a long-period pressing of said third button which is performed for not less than the predetermined period of time.

10. A terminal according to claim 2, wherein a plurality of functions are respectively assigned to said first to third buttons in accordance with each window content of said display screen, and
displays indicating functions that can be selected on current window contents are sequentially called up by pressing said third button.

11. A terminal according to claim 10, wherein execution of a function corresponding to a called display is designated by operating said second button.

12. A terminal according to claim 1, wherein said operation buttons are arranged in a line below said display screen.

13. A terminal according to claim 1, wherein operation buttons of said operation buttons which are located on the two sides are located on left and right sides of said display screen.

14. A terminal according to claim 1, wherein a plurality of predetermined functions that can be selected in accordance with window contents are simultaneously displayed on said display screen in correspondence with said operation buttons.

15. A portable radio terminal comprising:

radio communication means for performing radio communication of a signal through a radio channel;

a radio terminal body incorporating said radio communication means;

a display screen which is formed on a front surface of said radio terminal body to display functions;

input buttons including a plurality of operation buttons arranged near said display screen, said operation buttons having functions displayed at corresponding positions within said display screen; and control means for executing a function in accordance with operation of said operation button, wherein first, second, and third buttons constituting said operation buttons are successively arranged in a line along said display screen, said first and third buttons arranged on two sides are assigned as scroll buttons for said display screen in information input operation, and said second button placed at a middle position is assigned as a selection processing button for contents displayed on said display screen in information input operation, wherein functions that can be selected are hierarchically arranged in accordance with hierarchical levels of said display screen, and a size of the scroll icon displayed on said display screen changes in accordance with the hierarchical levels of said display screen.

* * * * *